(12) United States Patent
Younger

(10) Patent No.: US 8,800,711 B1
(45) Date of Patent: Aug. 12, 2014

(54) AUTOMATIC TRANSMISSION PRESSURE REGULATION

(71) Applicant: Steven W. Younger, Hacienda Heights, CA (US)

(72) Inventor: Steven W. Younger, Hacienda Heights, CA (US)

( * ) Notice: Subject to any disclaimer, the term of this patent is extended or adjusted under 35 U.S.C. 154(b) by 0 days.

(21) Appl. No.: 13/974,394

(22) Filed: Aug. 23, 2013

(51) Int. Cl.
*F16H 61/4017* (2010.01)
*F16K 15/04* (2006.01)
*F16H 61/00* (2006.01)

(52) U.S. Cl.
CPC ....... *F16K 15/044* (2013.01); *F16H 2061/0065* (2013.01); *F16H 61/4017* (2013.01); *F26H 2061/0062* (2013.01)
USPC .............................. 180/337; 192/3.51; 477/34

(58) Field of Classification Search
CPC ............ F16H 61/4017; F16H 61/4008; F16H 2061/0065; F16H 2061/0062
USPC ....... 180/337; 137/15.22; 192/3.51; 477/158, 477/156, 34
See application file for complete search history.

(56) References Cited

U.S. PATENT DOCUMENTS 5,820,507 A * 10/1998 Younger ........................ 475/116
7,287,444 B2 * 10/2007 Carne .......................... 74/606 R

* cited by examiner

*Primary Examiner* — Keith Frisby
(74) *Attorney, Agent, or Firm* — Kenneth L. Green

(57) ABSTRACT

An easily adjustable pressure relief valve for adjusting maximum fluid pressure levels in automatic transmissions at events. Engines used in racing and exhibitions require automatic transmissions with increased fluid pressure to prevent slipping during shifts. The pressure relief valve replaces a main mod line solenoid accumulator and includes an easily replaceable spring allowing adjustment of maximum fluid pressure at each event. The relief valve spring is selectable to adjust maximum fluid pressure for each event.

3 Claims, 5 Drawing Sheets

AUTOMATIC TRANSMISSION PRESSURE REGULATION

BACKGROUND OF THE INVENTION

The present invention relates to automatic transmissions and in particular to controlling peak pressures in automatic transmissions modified to operate at high pressures for use with increased torque.

There is a growing interest in high performance applications of vehicles with diesel engines. Such engines are being modified to produce between 1,000 and 4,000 foot pounds of torque or there about for tractor pull and drag racing events. Such high torque levels generally result in automatic transmission clutches slipping. To reduce such slipping, the transmissions are modified to increase the transmission fluid pressure in the transmissions. Normal fluid pressure is typically 85 PSI, and under throttle up to 240 PSI, briefly, but the pressures required to prevent slipping in the under up to 4,000 foot pounds of torque may be as high as 325 to 450 PSI.

Fluid pressure in the transmission may be raised by using a stiffer spring in the main pressure regulator. For example, during overhaul the main pressure regulator valve spring may be replaced to raise maximum fluid pressure from 85 PSI to 250 to 285 PSI. However, the main pressure regulator established a minimum pressure, and, for example, during a shift when a clutch might slip, the operating pressure is increased by the main mod line solenoid which momentarily raises the operating pressure by as much as 180 PSI by adding fluid pressure to the main pressure regulator spring pressure.

Each of the tractor pull and drag racing events require different engine settings, for example, some events benefit from very high torque output and other only require a lower torque output to be competitive. Running at high torque in every event requires greater engine maintenance and costs, and as a result, teams often run at lower torque levels. The lower torque levels allow lower pressure in the transmission which would also reduce transmission failures. The ability to run at lower torque levels may not be understood until the conditions at the events determined at the time of the event.

Unfortunately, known methods require replacing the main pressure regulator spring to adjust transmission pressure, and replacing the main pressure regulator spring requires removing the transmission which is often not feasible at an event.

BRIEF SUMMARY OF THE INVENTION

The present invention addresses the above and other needs by providing an easily adjustable pressure relief valve for adjusting maximum fluid pressure levels in automatic transmissions at events. Engines used in racing and exhibitions require automatic transmissions with increased fluid pressure to prevent slipping during shifts. The pressure relief valve replaces a main mod line solenoid accumulator and includes an easily replaceable spring allowing adjustment of maximum fluid pressure at each event. The relief valve spring is selectable to adjust maximum fluid pressure for each event.

In accordance with one aspect of the invention, there is provided a method for modifying an automatic transmission to allow easily adjusting maximum pressure. The method includes removing the pan from an automatic transmission, removing the accumulator plate from the automatic transmission, removing a main mod line solenoid accumulator from an accumulator seat in a shift valve body of the automatic transmission, placing a relief valve body in the accumulator seat, placing a relief valve ball in the relief valve body, placing a relief valve spring in the relief valve body resting against the relief valve ball, replacing the accumulator plate, and replacing the pan. The maximum pressure may then be easily adjusted without removing the transmission from the vehicle.

In accordance with another aspect of the invention, there is provided a method for adjusting fluid pressure in an automatic transmission. The method includes measuring the fluid pressure in the automatic transmission, selecting a new relief valve spring to adjust the fluid pressure, removing the pan from an automatic transmission, removing the accumulator plate from the automatic transmission, removing a relief valve spring in the relief valve body resting against the relief valve ball, replacing the relief valve spring in the relief valve body resting against the relief valve ball, replacing the accumulator plate, and replacing the pan.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
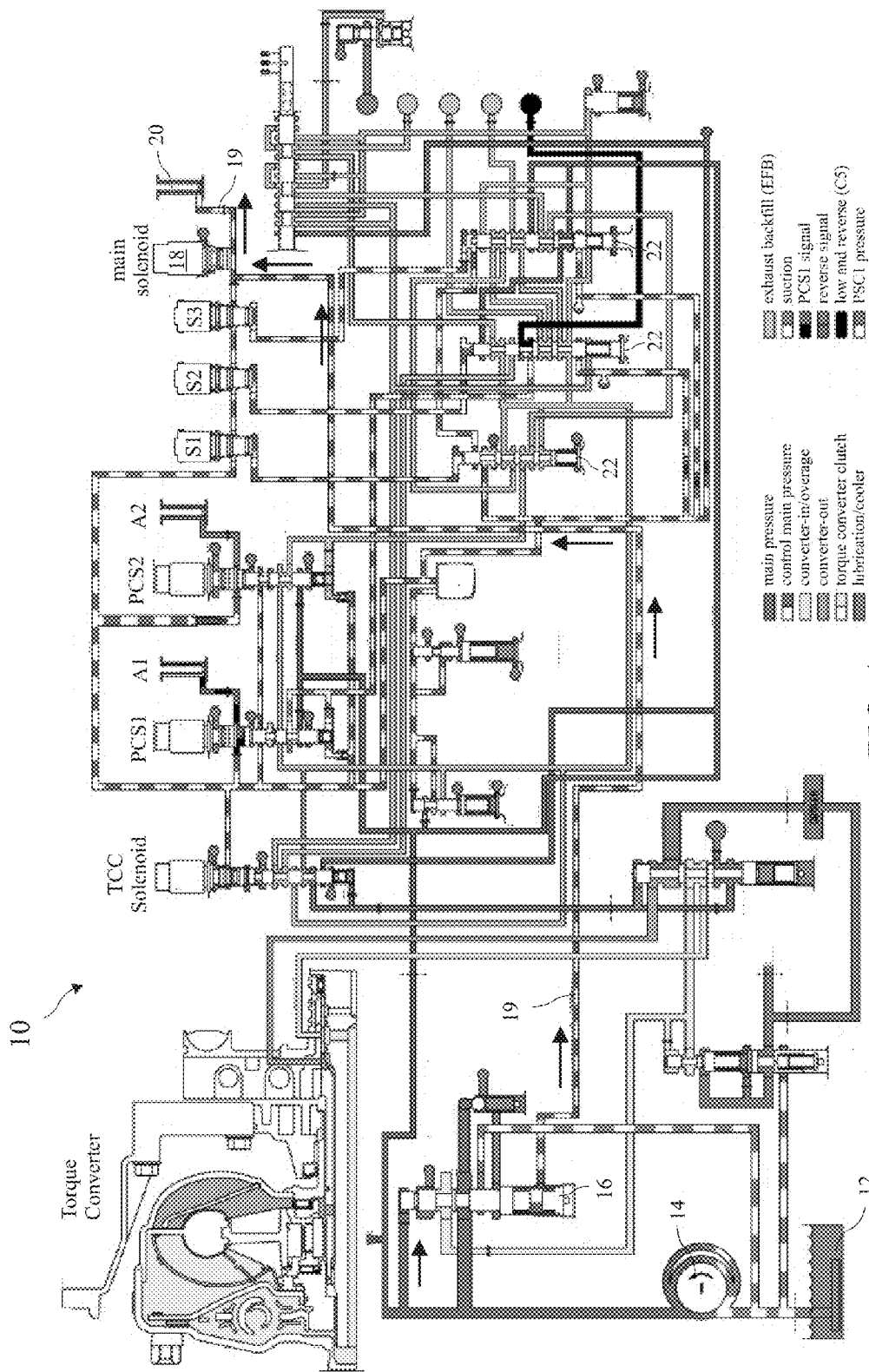
FIG. 1 shows a schematic of a prior art automatic transmission.

A schematic 10 of a prior art automatic transmission 50 (see FIG. 2) is shown in FIG. 1. The automatic transmission 50 includes a sump 12 holding transmission fluid, a pump 14 circulating the transmission fluid through the automatic transmission 10, a main pressure regulator 16 for regulating fluid pressure in the automatic transmission 10, a main mod line solenoid 18 for using a pressure control signal 19 to boost fluid pressure from the main pressure regulator 16 to the clutches 22 and other components during shifts, and a main mod line solenoid accumulator 20 on an outlet of the main mod line solenoid 18 to dampen high frequency fluctuations in the pressure control signal 19. Transmissions used in tractor pull events and racing often require higher fluid pressure to prevent slipping. Such desired higher pressure is obtained by adding a stiffer main pressure regulator valve spring to raise, for example, a base fluid pressure to as much as 250 PSI, however such base fluid pressures can be boosted to as high as 370 PSI by a Transmission Control Unit (TCU) controlling the main mod solenoid 18 by raising fluid pressure from the main pressure regulator 16 by, for example, 120 PSI. Various combinations of main pressure regulator valve springs 16a (see FIG. 4) and relief valve springs 28 (see FIG. 8) can be combined according to the present invention to establish a desired base fluid and a desired boosted pressure. Achieving a higher than necessary pressure can unnecessarily damage the transmission. Unfortunately, changing the main pressure regulator valve spring to adjust the maximum pressure requires removing the transmission 50 from the vehicle, and is not feasible at events to adjust the pressure for each event.

Figure 2:
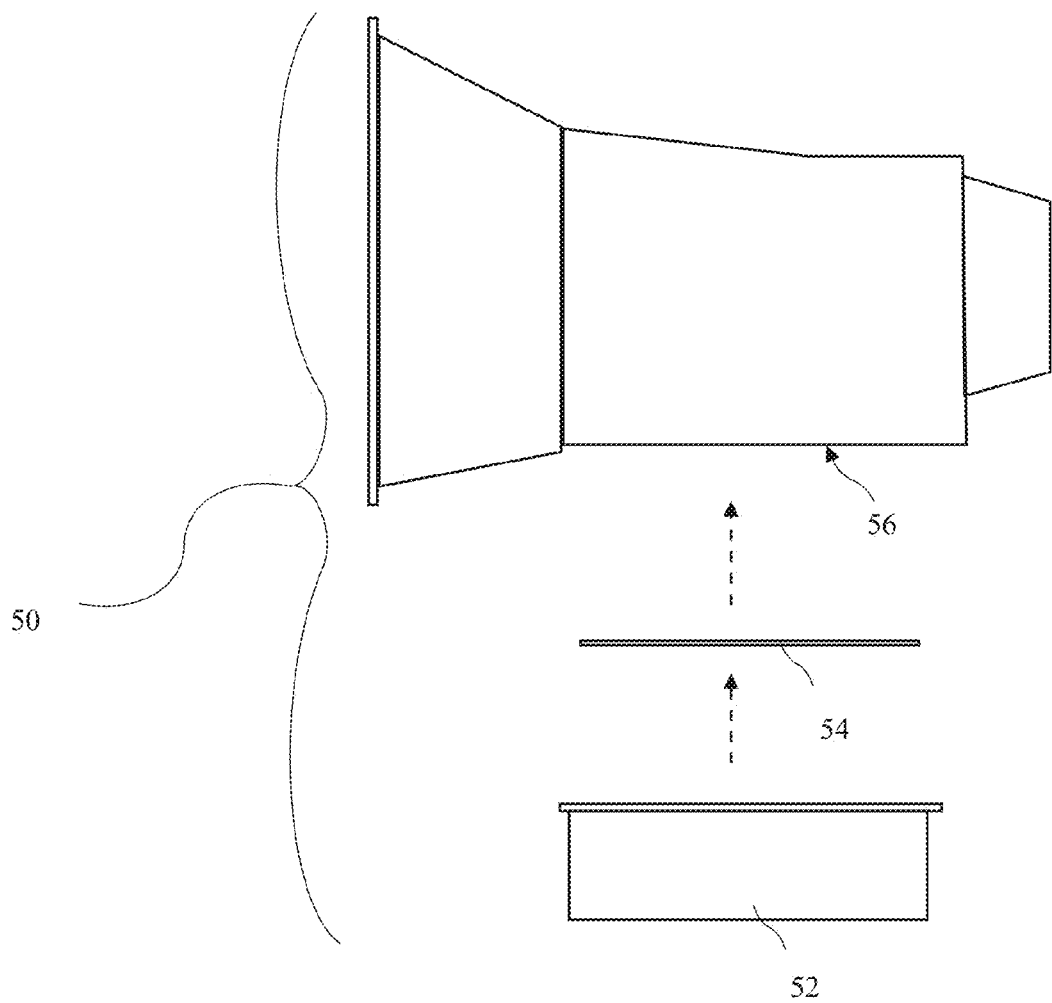
FIG. 2 shows the prior art automatic transmission with a pan and accumulator plate removed.

A prior art automatic transmission 50 with a pan 52 and accumulator plate 54 removed is shown in FIG. 2. Removing the pan 52 and accumulator plate 54 provides access to a shift valve body 56 in the transmission housing 56.

Figure 3:
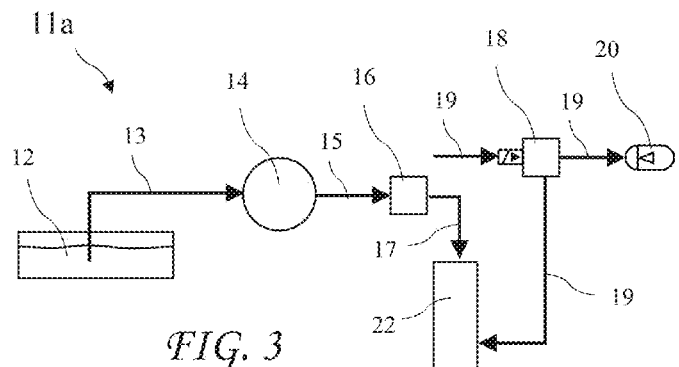
FIG. 3 shows a main solenoid circuit of the prior art automatic transmission.

A main solenoid circuit 11a of the prior art automatic transmission 50 is shown in FIG. 3. The main solenoid circuit 11a includes the sump 12 holding transmission fluid 13, the pump 14 circulating the transmission fluid 15 through the automatic transmission 10, the main pressure regulator 16 controlling fluid 17 pressure provided to clutches 22 of the automatic transmission, and the main mod line solenoid 18 providing the pressure control signal 19 to the main pressure regulator 16. The accumulator 20 dampens high frequency fluctuations in the pressure control signal 19.

Figure 4:
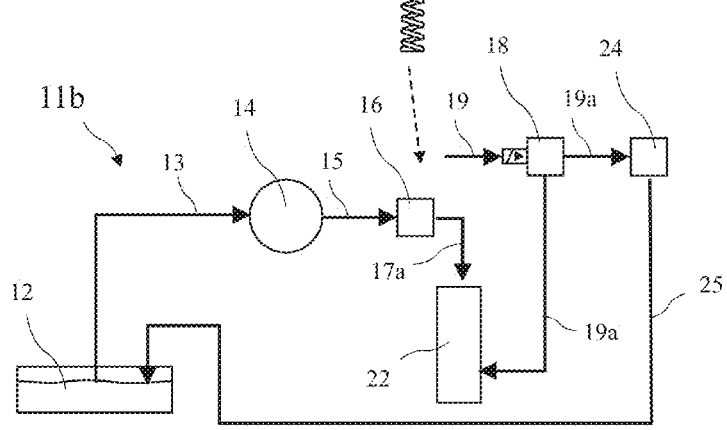
FIG. 4 shows modified main solenoid circuit according to the present invention.

A modified main solenoid circuit 11b according to the present invention is shown in FIG. 4. The modified main solenoid circuit 11b includes the main pressure regulator 16 having a replacement spring 16a providing a higher pressure fluid flow 17a to the clutches 22 of the automatic transmission 50. The accumulator 20 is replaced by a relief valve 24. The relief valve 24 is configured to reside in the cavity provided for the accumulator 20 and is adjustable to control the maximum fluid pressure to the components 22. The relief valve 24 reduces the pressure control signal 19 to a reduced pressure control signal 19a to reduce the higher pressure fluid flow 17a to avoid damaging transmission parts. Replacing the replacement spring 16a to adjust the higher pressure fluid flow 17a requires removing the transmission 50 from the vehicle. A relief valve spring 28 (see FIG. 8) in the relief valve 24 may be replaced to adjust the higher pressure fluid flow 17a without removing the transmission 50 from the vehicle.

Figure 5A:
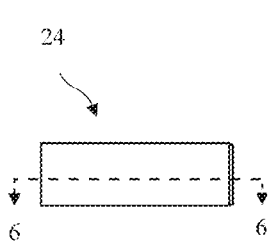
FIG. 5A is a side view of a relief valve body according to the present invention.
Figure 5B:
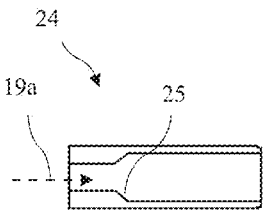
FIG. 5B is an end view of the relief valve body according to the present invention.
Figure 6:
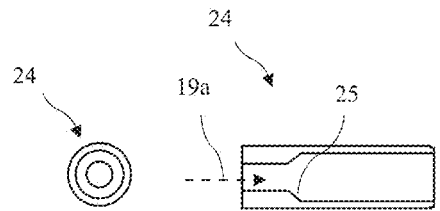
FIG. 6 is a cross-sectional view of the relief valve body according to the present invention taken along line 6-6 of FIG. 5A.
Figure 7:
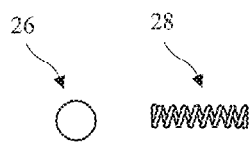
FIG. 7 is a relief valve ball according to the present invention.
Figure 8:
FIG. 8 is a relief valve spring according to the present invention.

A side view of a relief valve body 24 is shown in FIG. 5A, an end view of the relief valve body 24 is shown in FIG. 5B. and a cross-sectional view of the relief valve body 24, taken along line 6-6 of FIG. 5A, is shown in FIG. 6. A relief valve ball 26 is shown in FIG. 7 and a relief valve spring 28 is shown in FIG. 8. The spring 28 pushed the ball 26 against a seat 25 in the relief valve body 24. The spring 28 is selected to hold the ball 26 against the seat 25 until the pressure of the reduced pressure control signal 19a exceeds a safe upper limit, and then the ball 26 is forced off of the seat 25 to release fluid into the sump 12 to limit the pressure of the higher pressure fluid flow 17a to the clutches 22. The reduced pressure control signal 19a is preferably less than 115 PSI.

Figure 9:
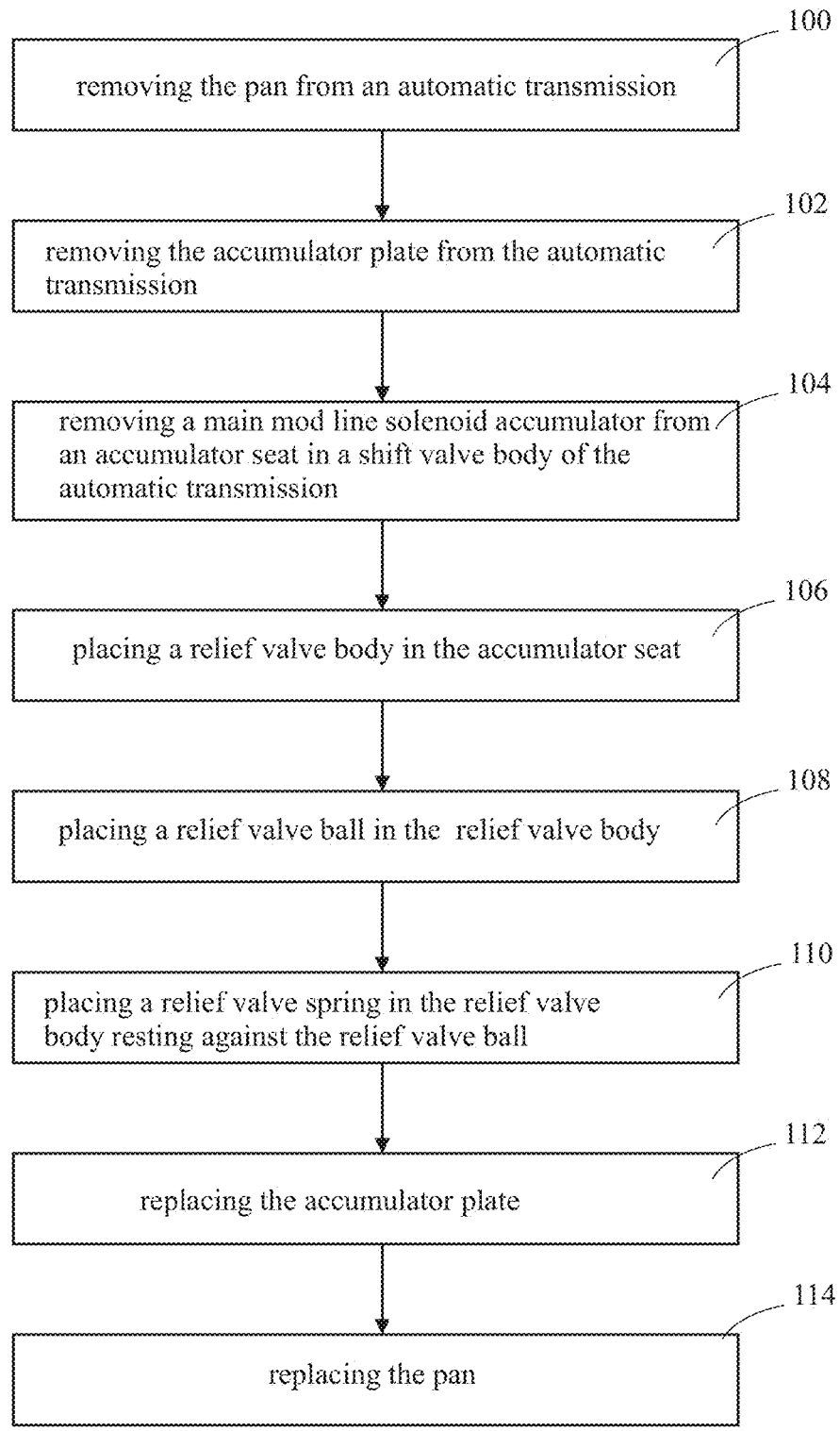
FIG. 9 is a method according to the present invention for modifying an automatic transmission to allow easy adjustment of maximum fluid pressure.

A method according to the present invention for modifying an automatic transmission to limit the reduced pressure control signal 19a is shown in FIG. 9. The method includes removing the pan from an automatic transmission at step 100, removing the accumulator plate from the automatic transmission at step 102, removing a main mod line solenoid accumulator from an accumulator seat in a shift valve body of the automatic transmission at step 104, placing a relief valve body in the accumulator seat at step 106, placing a relief valve ball in the relief valve body at step 108, placing a relief valve spring in the relief valve body resting against the relief valve ball at step 110, replacing the accumulator plate at step 112, and replacing the pan at step 114.

Figure 10:
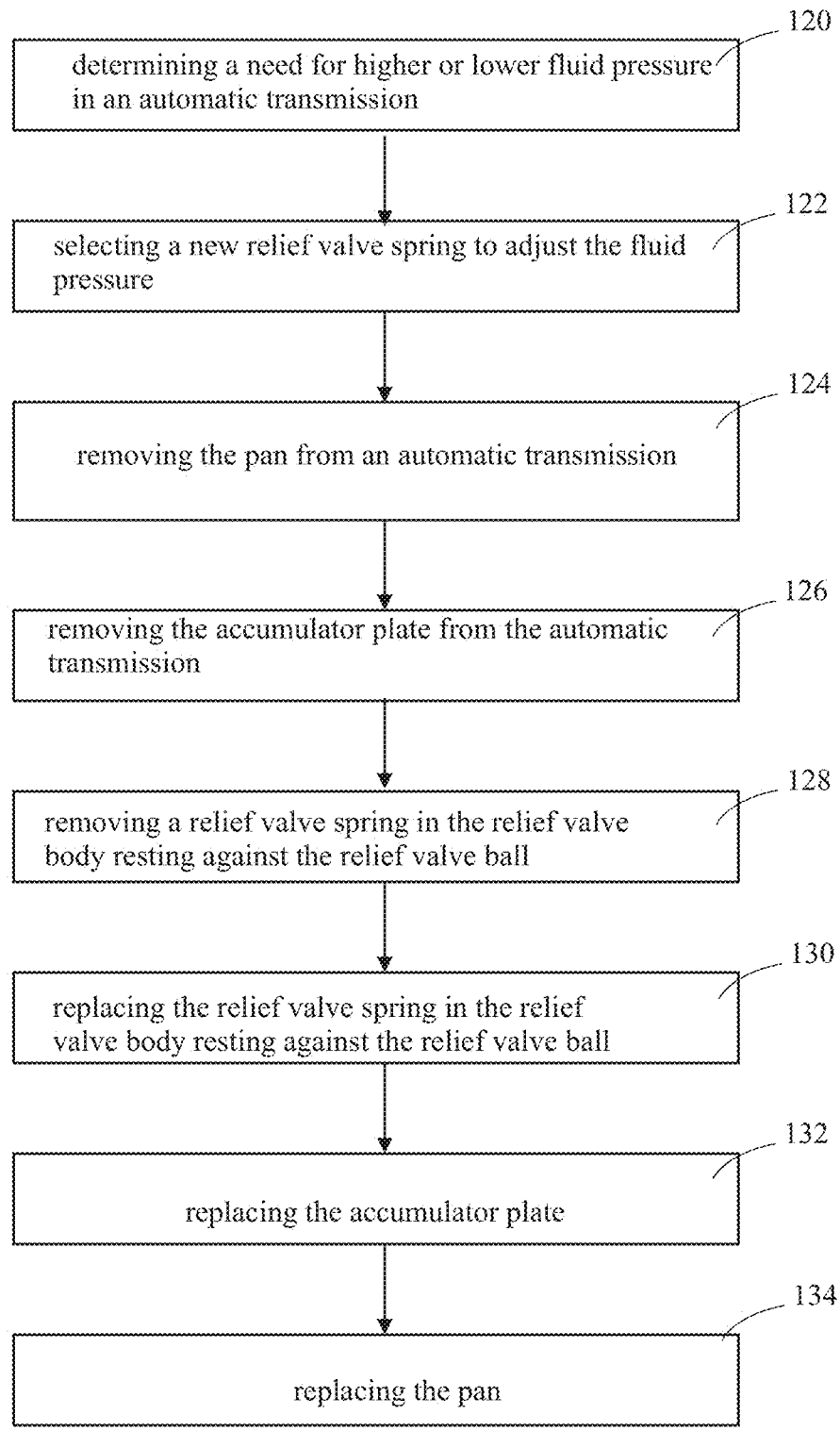
FIG. 10 is a method according to the present invention for adjusting maximum fluid pressure in an automatic transmission.

A method according to the present invention for adjusting fluid pressure in an automatic transmission is shown in FIG. 10. The method includes determining a need for higher or lower fluid pressure in an automatic transmission at step 120, selecting a new relief valve spring to adjust the fluid pressure at step 122, removing the pan from an automatic transmission at step 124, removing the accumulator plate from the automatic transmission at step 126, removing a relief valve spring in the relief valve body resting against the relief valve ball at step 128, replacing the relief valve spring in the relief valve body resting against the relief valve ball at step 130, replacing the accumulator plate at step 132, and replacing the pan at step 134.

While the invention herein disclosed has been described by means of specific embodiments and applications thereof, numerous modifications and variations could be made thereto by those skilled in the art without departing from the scope of the invention set forth in the claims.

I claim:

1. A method for controlling maximum pressure in an automatic transmission, the method comprising:
    removing a pan from an automatic transmission in a vehicle;
    removing the accumulator plate from the automatic transmission;
    removing a main mod line solenoid accumulator from an accumulator seat in a shift valve body of the automatic transmission;
    placing a relief valve body in the accumulator seat;
    placing a relief valve ball in the relief valve body;
    placing a relief valve spring in the relief valve body resting against the relief valve ball;
    replacing the accumulator plate in the automatic transmission; and
    replacing the pan.

2. The method of claim 1, further including a method for adjusting fluid pressure in an automatic transmission, the method comprising:
    determining a need for higher or lower fluid pressure in an automatic transmission;
    selecting a new relief valve spring to adjust the fluid pressure;
    removing the pan from an automatic transmission;
    removing the accumulator plate from the automatic transmission;
    removing a relief valve spring in the relief valve body resting against the relief valve ball;
    replacing the relief valve spring in the relief valve body resting against the relief valve ball, replacing the accumulator plate; and
    replacing the pan.

3. A method for controlling maximum pressure in an automatic transmission, the method comprising:
    in a shop:
        removing an automatic transmission from a vehicle;

partially disassembling the automatic transmission to gain access to a main pressure regulator in the automatic transmission;

replacing a spring in the main pressure regulator with a higher pressure spring;

removing a main mod line solenoid accumulator from an accumulator seat in a shift valve body of the automatic transmission;

placing a relief valve body in the accumulator seat;

placing a relief valve ball in the relief valve body;

placing a relief valve spring in the relief valve body resting against the relief valve ball; and reassembling the automatic transmission; and at an event:

determining a need for higher or lower fluid pressure in an automatic transmission;

selecting a new relief valve spring to adjust the fluid pressure;

removing the pan from an automatic transmission;

removing the accumulator plate from the automatic transmission;

removing a relief valve spring in the relief valve body resting against the relief valve ball;

replacing the relief valve spring in the relief valve body resting against the relief valve ball, replacing the accumulator plate; and replacing the pan.

\* \* \* \* \*